United States Patent
Carvalho

(10) Patent No.: US 8,186,951 B2
(45) Date of Patent: May 29, 2012

(54) MOUNTING ASSEMBLY FOR A PROPELLER SYSTEM COMPONENT

(75) Inventor: Paul A. Carvalho, Westfield, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 455 days.

(21) Appl. No.: 12/464,130

(22) Filed: May 12, 2009

(65) Prior Publication Data

US 2010/0008792 A1    Jan. 14, 2010

Related U.S. Application Data

(60) Provisional application No. 61/134,844, filed on Jul. 14, 2008.

(51) Int. Cl.
*B63H 1/00*    (2006.01)
(52) U.S. Cl. ........................... 416/61; 416/244 R
(58) Field of Classification Search .................. 416/133, 416/155, 162
See application file for complete search history.

(56) References Cited

U.S. PATENT DOCUMENTS

| | | | |
|---|---|---|---|
| 3,977,812 | A | 8/1976 | Hudgins |
| 4,531,694 | A | 7/1985 | Soloy |
| 4,688,995 | A | 8/1987 | Wright et al. |
| 4,829,850 | A | 5/1989 | Soloy |
| 5,606,247 | A | 2/1997 | Sutrina |
| 6,069,341 | A | 5/2000 | Gage et al. |
| 6,137,082 | A | 10/2000 | Pruden et al. |
| 6,213,713 | B1 | 4/2001 | Dickmann |
| 6,264,138 | B1 | 7/2001 | Hawkins |
| 6,450,052 | B1 | 9/2002 | Luh |
| 6,769,874 | B2 | 8/2004 | Arel |
| 6,789,522 | B2 | 9/2004 | Seymour |
| 6,817,572 | B2 | 11/2004 | Negulescu et al. |
| 6,981,844 | B2 | 1/2006 | Perkinson et al. |
| 7,144,349 | B2 | 12/2006 | Mitrovic |
| 7,503,750 | B1 | 3/2009 | Violette |

OTHER PUBLICATIONS

Combined Search and Examination Report under Section 17 & 18(3) for Application No. GB0910706.1 dated Oct. 12, 2009.

*Primary Examiner* — Cheung Lee
(74) *Attorney, Agent, or Firm* — Carlson, Gaskey & Olds PC

(57) ABSTRACT

A mounting assembly for a propeller assembly component includes a monolithic piece having a housing and a mounting pad. An auxiliary component is directly mounted to the mounting pad of the monolithic piece.

7 Claims, 2 Drawing Sheets

MOUNTING ASSEMBLY FOR A PROPELLER SYSTEM COMPONENT

CROSS-REFERENCE TO RELATED APPLICATIONS

This application claims priority to U.S. Provisional Application No. 61/134,844, filed Jul. 14, 2008.

BACKGROUND OF THE DISCLOSURE

This disclosure generally relates to a propeller system, and more particularly to a mounting assembly for a propeller system component.

Existing propeller systems include propeller blades attached to a gearbox output shaft via a bolted flange on a propeller hub of the propeller system. The gearbox drives the propeller hub, which in turn rotates the propeller blades about an axis of rotation. The bolted arrangement between the propeller hub and the gearbox positions the propeller blades at a certain distance upstream relative to a front wall of the gearbox housing.

Propeller system auxiliary components, such as brush-block assemblies and propeller sensors, are mounted to the gearbox housing to monitor certain criteria of the propeller blades of the propeller system, such as blade deicing and speed monitoring. The auxiliary components are mounted via separate brackets that span the distance between the front wall of the gearbox housing and the propeller blade. Separate brackets of the type described above must be designed to meet cost, weight and resonance issues related to a particular propeller system.

SUMMARY OF THE DISCLOSURE

A mounting assembly for a component of a propeller assembly includes a monolithic piece having a housing and a mounting pad. An auxiliary component is directly mounted to the mounting pad.

A propeller system includes a propeller blade, a propeller hub, a gearbox and an auxiliary component. The propeller blade rotates about an axis of rotation. The propeller hub includes an integrated tailshaft that supports the propeller blade. A gearbox drives the tailshaft to rotate the propeller blade. The gearbox includes a monolithic piece having a housing and an integrally formed mounting pad. The auxiliary component is directly mounted to the mounting pad.

A method of mounting an auxiliary component to a gearbox of a propeller system includes forming a housing and a mounting pad of the gearbox as a monolithic piece. An auxiliary component is directly mounted to the mounting pad of the monolithic piece of the gearbox.

The various features and advantages of this disclosure will become apparent to those skilled in the art from the following detailed description. The drawings that accompany the detailed description can be briefly described as follows.

DETAILED DESCRIPTION OF THE EXAMPLE EMBODIMENTS

Figure 1:
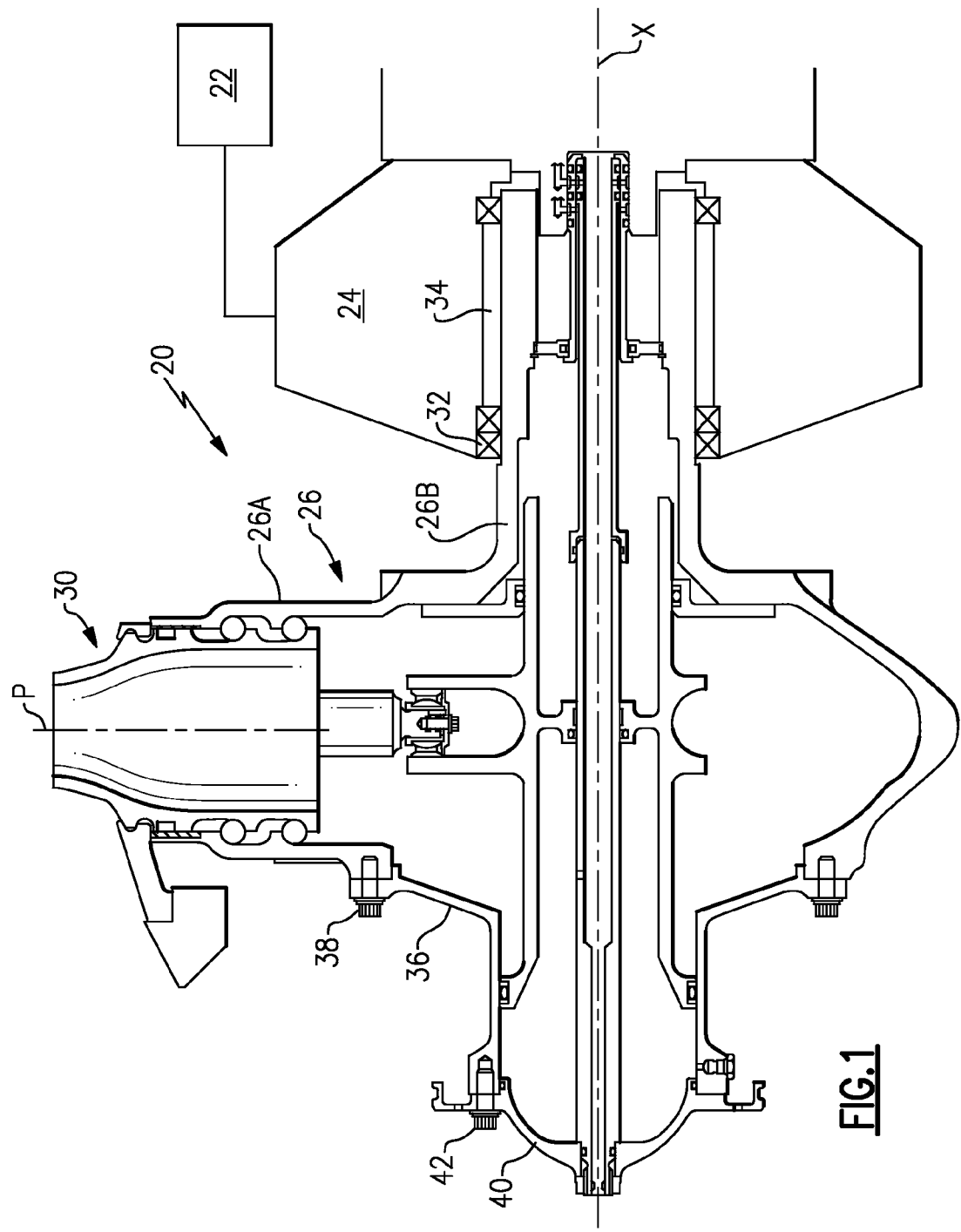
FIG. 1 is a schematic view of an example propeller system.

FIG. 1 schematically illustrates a propeller system 20 such as that for an aircraft. It should be understood that although a propeller system typical of a turboprop aircraft is illustrated in this example, various aircraft configurations and/or machines such as a compound aircrafts, turboprops, tilt rotors and other machines such as wind turbines could benefit from the present disclosure.

In one example, the propeller system 20 is powered by a gas turbine engine 22 (illustrated schematically) that drives a gearbox 24. The gearbox 24 decreases rotational speed and increases output torque of the propeller system 20. The gearbox 24, in turn, drives a propeller hub 26 about a propeller axis rotation X.

At least one propeller blade 30 extends from and is attached to the propeller hub 26. The propeller system 20 could include a multitude of propeller blades 30. The propeller blade 30 rotates about the axis of rotation X. Each propeller blade 30 is defined along a propeller blade axis P that is transverse to the axis of rotation X. It should be understood that the propeller blades 30 as described herein include various aerodynamic surfaces such as blades, rotors, prop-rotors and other surfaces.

The propeller hub 26 integrates a propeller hub portion 26A with a tailshaft 26B. That is, the propeller hub 26 includes an integrated tailshaft 26B. The tailshaft 26B is supported by bearings 32, and is driven by the gearbox 24 through a splined interface 34, for example. The tailshaft 26B extends in the same direction as the axis of rotation X of the propeller hub 26. That is, the tailshaft 26B is positioned radially outward relative to the axis of rotation X, and extends parallel to the axis of rotation X. The gearbox 24 engages the tailshaft 26B to rotate the propeller hub 26.

An actuator dome 36 is mounted to the propeller hub portion 26A with a multiple of fasteners 38. An actuator dome cap 40 is mounted to the actuator dome with a multiple of fasteners 42 to seal the actuator dome 36.

Figure 2:
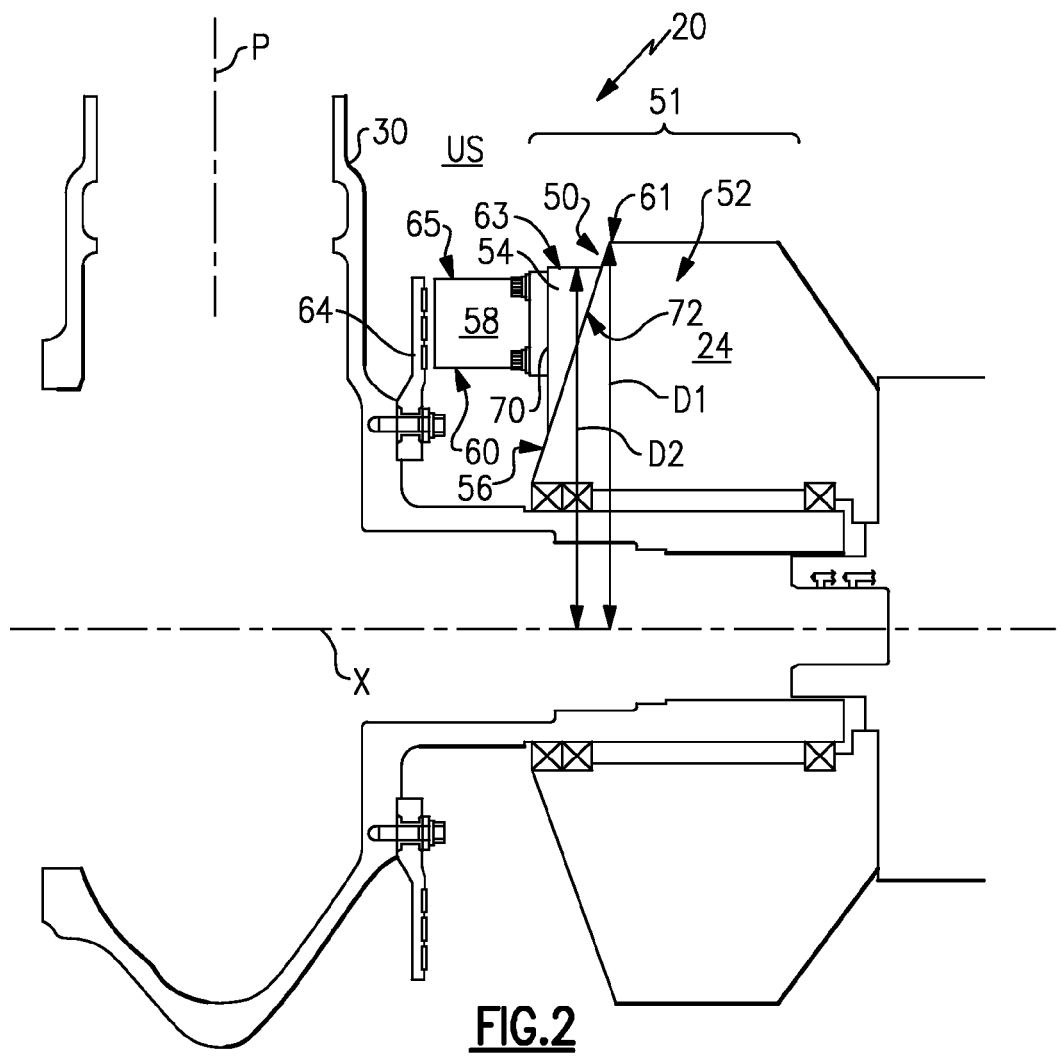
FIG. 2 illustrates an example mounting assembly for a propeller assembly component.

FIG. 2 illustrates a mounting assembly 50 for use within the example propeller system 20. In this example, the gearbox 24 includes a monolithic piece 51 having a housing 52 and a mounting pad 54. That is, the monolithic piece 51 of the gearbox 24 is a single, homogenous material with no mechanical attachments. Of course, although not depicted, the gearbox 24 would also include gears, bearings, hydraulic lubrications systems and other parts.

The mounting pad 54 is formed integrally with the housing 52 of the monolithic piece 51 of the gearbox 24. In one example, the mounting pad 54 is formed integrally with an upstream facing wall 56 of the housing 52 of the gearbox 24. The upstream facing wall 56 is positioned on an upstream side US of the gearbox 24. In one example, the upstream facing wall 56 faces an aft portion of the propeller blades 30.

The upstream facing wall 56 of the housing 52 is non-perpendicular relative to the axis of rotation X, in this example. The upstream facing wall 56 includes a radially outward most portion 61 that is spaced a first distance D1 from the axis of rotation X. The mounting pad 54 also includes a radially outward most portion 63 that is spaced a second distance D2 from the axis of rotation X. In this example, the first distance D1 is greater than the second distance D2. That is, the radially outward most portion 63 of the mounting pad 54 is positioned radially inward from the radially outward most potion 61 of the upstream facing wall 56.

The mounting pad 54 of the mounting assembly 50 includes a first surface 70 and a second surface 72. The first surface 70 faces the propeller blades 30, and the second surface 72 faces the gearbox 24. In the illustrated example, the first surface 70 is perpendicular to the axis of rotation X, and receives an auxiliary component 58. The second surface 72 of the mounting pad 54 is formed integrally with the housing 52, and is non-perpendicular relative to the axis of rotation X.

The auxiliary component 58 is directly mounted to the first surface 70 of the mounting pad 54. That is, no other components extend between the auxiliary component 58 and the first surface 70 of the mounting pad 54. In one example, the auxiliary component 58 is a brushblock assembly 60. The brushblock assembly 60 communicates with a slip ring assembly 64 to transmit electrical power to the propeller blade 30 for deicing the propeller blade 30. A radially outward most portion 65 of the brushblock assembly 60 is positioned radially inward relative to the radially outward most portion 61 of the upstream facing wall 56.

Figure 3:
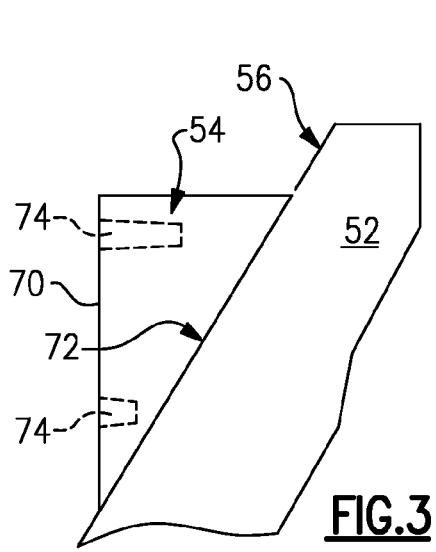
FIG. 3 illustrates an example mounting pad of the mounting assembly depicted in FIG. 2.

FIG. 3 illustrates various features of the example mounting pad 54 for mounting the brushblock assembly 60. The mounting pad 54 includes a plurality of openings 74 for receiving and fixedly attaching the auxiliary component 58. For example, the mounting pad 54 may include threaded inserts for receiving fasteners to attach the auxiliary component 58. The actual number of openings 74 will vary depending upon design specific parameters, including, but not limited to, the size and shape of the auxiliary component 58. In one example, the mounting pad 54 is cast integrally with the housing 52 to form the monolithic piece 51. In another example, the mounting pad 54 is machined into the housing 52 of the gearbox 24 to form the monolithic piece 51.

Figure 4:
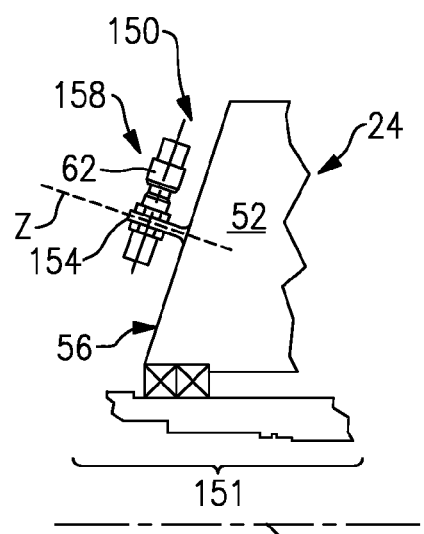
FIG. 4 illustrates another example mounting assembly for a propeller assembly component.

FIG. 4 illustrates another example mounting assembly 150 that includes an auxiliary component 158 that is directly mounted thereto. In this disclosure, like reference numerals designate like elements where appropriate, and reference numerals with the addition of 100 or multiples thereof designate modified elements. It is to be understood that the modified elements incorporate the same features and benefits of the corresponding original elements, except where stated otherwise.

In this example, the auxiliary component 158 is a sensor 62. The sensor 62 detects propeller blade 30 information, such as propeller speed or blade angle, for example. A person of ordinary skill in the art having the benefit of this disclosure would understand that the sensor 62 could be utilized to monitor any characteristic of the propeller blades 30.

A mounting pad 154 is formed integrally with the housing 52 of the monolithic piece 151 of the gearbox 24, and in this example, is formed integrally with the upstream facing wall 56 of the housing 52. In one example, the mounting pad 154 is cast integrally with the housing 52 to form the monolithic piece 151. In another example, the mounting pad 154 is machined into the housing 52 of the gearbox 24 to form the monolithic piece 151. The mounting pad 154 extends along an axis Z that is transverse to the axis of rotation X. The axis of rotation Z is also perpendicular to the upstream facing wall 56, in this example.

The mounting pad 154 further includes an opening 80 for receiving the sensor 62. In one example, the sensor 62 is threaded and is received by the opening 80, which includes corresponding threaded inserts for receiving the threaded portion of the sensor 62. A person of ordinary skill in the art having the benefit of this disclosure would understand that the mounting pad 154 could include any number of openings 80, or any other features, for attachment of the auxiliary component 158.

Although the examples illustrated herein include mounting a brushblock assembly 60 (See FIGS. 2-3) and/or sensors 62 (See FIG. 3), any other auxiliary component may be mounted based on the teachings of the example mounting assemblies 50, 150. It should be understood that like reference numerals identify corresponding or similar elements throughout the several drawings. It should also be understood that while a particular component arrangement is disclosed in the illustrated examples, other arrangements could benefit from this disclosure.

The foregoing description is illustrative and not limiting. A worker of ordinary skill in the art would recognize that certain modifications could come within the scope of this disclosure. For these reasons, the following claims should be studied to determine the true scope and content of this disclosure.

What is claimed is:

1. A mounting assembly for a component of a propeller assembly, comprising:
    a monolithic piece having a housing and a mounting pad that includes a first surface that faces a propeller blade of the propeller assembly;
    an auxiliary component directly mounted to said first surface of said mounting pad; and
    said housing including an upstream facing wall that faces a propeller blade of said propeller assembly, and said mounting pad is formed integrally with said upstream facing wall, wherein said upstream facing wall of said housing is non-perpendicular relative to an axis of rotation of said propeller assembly.

2. The assembly as recited in claim 1, wherein a radially outward most portion of said mounting pad is positioned radially inward from a radially outward most portion of said upstream facing wall.

3. The assembly as recited in claim 1, wherein said mounting pad includes at least one opening for receiving said auxiliary component.

4. The assembly as recited in claim 1, wherein said mounting pad includes a second surface opposite of said first surface, and said second surface faces a gearbox.

5. The assembly as recited in claim 1, wherein said second surface is non-perpendicular relative to an axis of rotation of the propeller assembly.

6. The assembly as recited in claim 1, wherein said auxiliary component is positioned axially between said propeller blade and said mounting pad.

7. A mounting assembly for a component of a propeller assembly, comprising:
    a monolithic piece having a housing and a mounting pad that includes a first surface that faces a propeller blade of the propeller assembly;
    an auxiliary component directly mounted to said first surface of said mounting pad; and
    said mounting pad including a second surface opposite of said first surface, and said second surface faces a gearbox and is non-perpendicular relative to an axis of rotation of the propeller assembly.

* * * * *